UNITED STATES PATENT OFFICE.

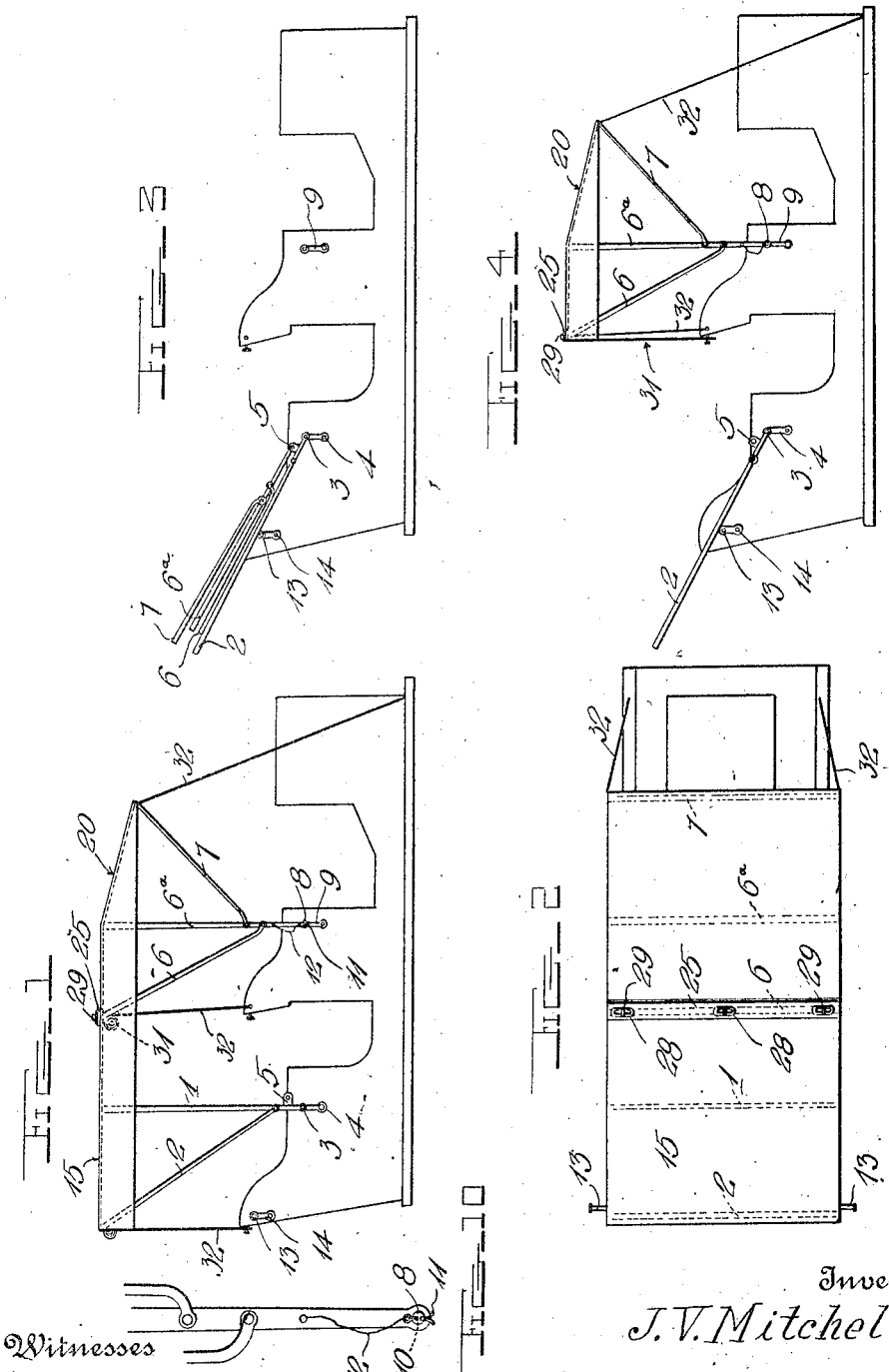

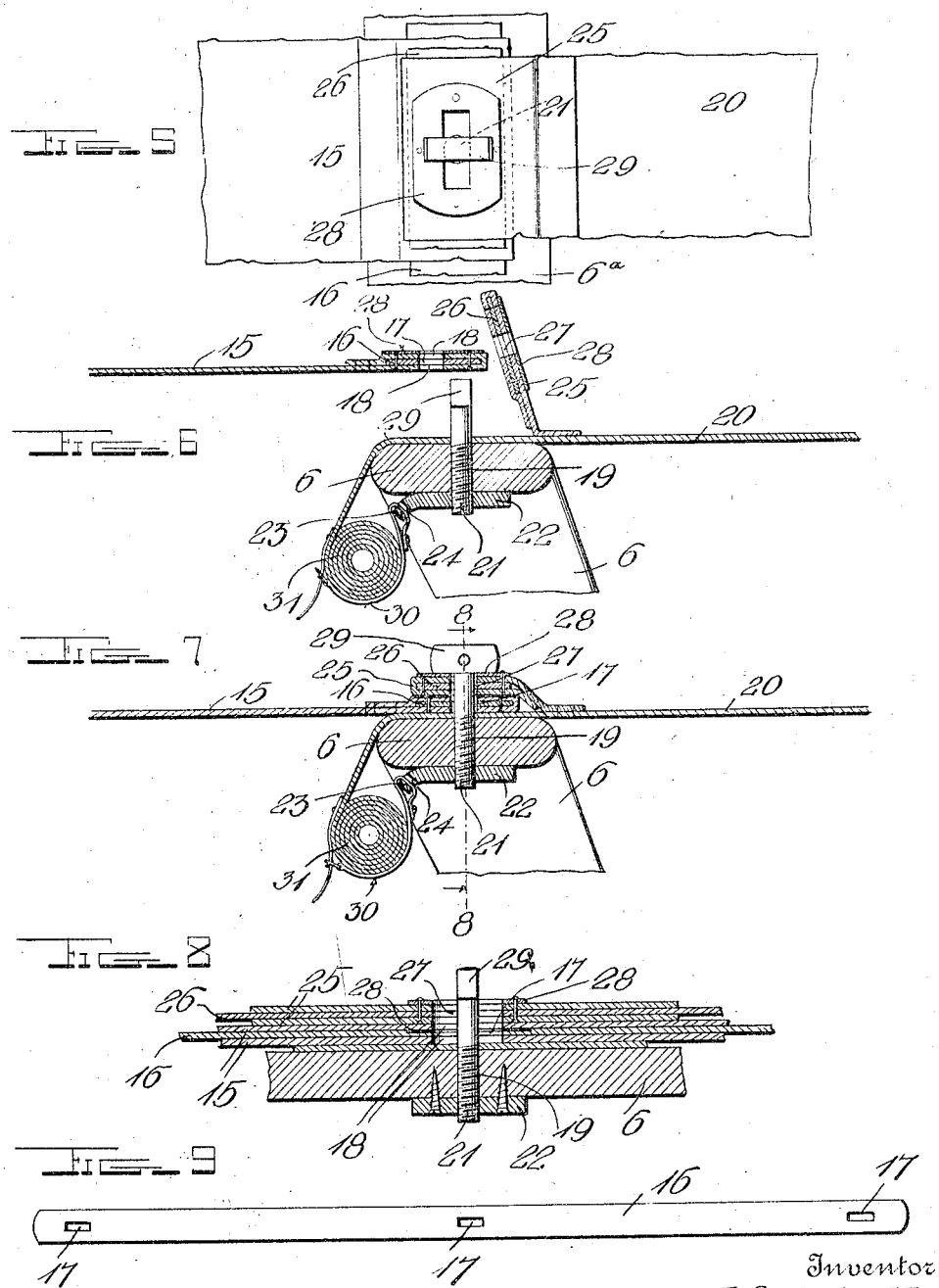

JAMES V. MITCHELL, OF MARTINSVILLE, INDIANA.

AUTOMOBILE-TOP.

988,204.  Specification of Letters Patent.  Patented Mar. 28, 1911.

Application filed June 13, 1910. Serial No. 566,546.

*To all whom it may concern:*

Be it known that I, JAMES V. MITCHELL, a citizen of the United States, residing at Martinsville, in the county of Morgan and State of Indiana, have invented certain new and useful Improvements in Automobile-Tops; and I do declare the following to be a full, clear, and exact description of the invention, such as will enable others skilled in the art to which it appertains to make and use the same.

This invention relates to improvements in automobile tops.

The object of the invention is to provide an automobile top formed in front and rear sections both of which may be folded back to an inoperative position behind the rear seat or both entirely removed in the same manner as the ordinary top, or simply the rear section may be folded or entirely removed allowing the front section to remain in operative position over the front seat.

With the foregoing and other objects in view, the invention consists of certain novel features of construction, combination and arrangement of parts as will be more fully described and particularly pointed out in the appended claims.

In the accompanying drawings: Figure 1 is a side view of the body of an automobile showing my improved top applied thereto; Fig. 2 is a top plan view of the same; Fig. 3 is a view similar to Fig. 1 showing both sections of the top swung back behind the rear seat; Fig. 4 is a similar view showing the front section of the top in operative position and the rear section swung back; Fig. 5 is an enlarged plan view of a portion of the meeting edges of the two sections showing one of the fastening devices for said edges; Fig. 6 is an enlarged sectional view of the meeting edges of the front and rear sections of the top showing said edges separated and about to be engaged; Fig. 7 is a similar view showing the edges of the sections engaged and fastened; Fig. 8 is a vertical sectional view on the line 8—8 of Fig. 7; Fig. 9 is a plan view of one of the reinforcing plates for the meeting edges of the cover. Fig. 10 is an enlarged detail of the end of the intermediate bow of the front section.

Referring more particularly to the drawings, 1 and 2 denote the bows of the rear section of my improved top. The bow 1 is pivotally connected at its lower end with the supporting studs 3, formed on supporting brackets 4, said brackets being secured to the opposite sides of the rear seat of the automobile as shown. The bow 2 is pivotally connected at its lower ends to the bow 1, as shown. On the forward edges of the opposite ends of the bow 1, are formed apertured lugs 5, the purpose of which will hereinafter appear.

The front section of the top is provided with bows 6, 6ª and 7, said bows being provided on their lower ends with laterally projecting pivot studs 8 which are adapted to be pivotally and detachably engaged with the supporting brackets 9 secured to the opposite sides of the front seat as shown. In the outer ends of the studs 8 are formed apertures 10 with which are adapted to be engaged split keys 11 whereby said studs are held in operative engagement with the apertures in the brackets 9. The key 11 is preferably secured to the bow 6 by a strap or other flexible connection 12 so that said key will be retained in position for use when needed. The bow 7 of the front section of the top is pivotally connected to the bow 6ª as shown.

By thus arranging the bows for the front and rear sections of my improved top, said rear section may be folded back or entirely removed independently of the front section and the latter left in operative position, or both the front and rear sections may be folded back by disconnecting the studs 8 from the brackets 9 and moving the front section back onto the lowered rear section. When the front section has thus been moved back the studs 8 are preferably engaged with the apertured lugs 5 on the bows 1 of the rear section and are secured therein by the key 11, thus securely holding the front section in lowered position. When the sections are thus folded back or lowered, the bows of the rear section engage and are supported by the supporting bar 13 secured to the bracket 14 on the rear portion of the rear seat as shown.

In order to permit the rear section to be folded back or entirely removed independently of the front section of the top, I form the cover of the top in front and rear sections which, when the entire top is in an elevated or operative position, have their meeting edges engaged and fastened together in such manner as to provide a water tight joint. In constructing the joint for the meeting edges of the front and rear cover sections, the rear cover section 15 has formed in its front edge a hem in which is inserted a reinforcing plate 16, said plate being provided with a series of slots 17 which coincide with similar slots 18 formed in the hem in which the plate 16 is inserted. The plate 16 is secured in the hem by rivets or other suitable fasteners.

In the upper cross bar of the rear bow 6, of the front section, is formed a series of bolt holes 19, through which and through the adjacent portion of the front cover 20 are inserted a series of fastening bolts 21, the inner ends of which have a screw threaded engagement with the nuts 22 secured to the under side of the bow by screws or other suitable fastening devices. The nuts 22 are provided with rearward projections 23 in which are formed slots 24, the purpose of which will be hereinafter described.

Stitched or otherwise suitably secured to the cover 20, immediately ahead of the bow 6, is a flexible cover flap 25 having formed therein a hem in which is inserted a reinforcing plate 26 similar in construction to the plate 16, and having formed therein slots 27 which register with similar slots formed in the opposite sides of the hem of the flap. On the upper side of the flap and on the upper side of the hem of the rear cover section, over each of the slots formed therein, are secured wear plates 28 with which are engaged the heads 29 of the screws 21 when the flap is closed and the screws turned to operative position. When the front and rear cover sections are in operative positions, the inner slotted end of the rear section is adapted to engage the inner edge of the front section and when so engaged the heads 29 of the screws 21 are passed through the slots 18 and the heads 17 in the hem and reinforcing plate of said inner end of the rear section after which the flap 25 is swung down onto said end of the rear section. When the plate is thus swung down the slots therein and in the reinforcing plate of the flap are engaged with the heads 29 of the screws 21 after which said screws are turned to bring the heads crosswise of the holes in the wear plate 28, thereby securely holding the flap down in engagement with the inner end of the rear section thus securing said sections together to form a water tight joint.

Secured to the slotted extensions 23 of the nuts 22 and to the rear side of the curtain are curtain holding straps 30 which are adapted to support, in rolled position, a curtain 31 which is secured to the rear edge of the front section of the top and is adapted to be let down behind said section when the rear section of the top is folded back and the front section allowed to remain in operative position. Or if, when the front and rear sections of the top are in operative position, it is desired to give the rear compartment a closed cab effect the curtain 31 may be let down and secured to the back of the front seat. The rear section may be provided with the usual or any suitable form of curtain 31. The front and rear sections of the top are provided with the usual bracing straps 32 which, when said sections are let down, are unfastened in the usual manner.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:

1. A top for two seated vehicles consisting of front and rear sections, said front section comprising bows adapted to be pivotally and detachably connected to opposite sides of the front seat, a cover section arranged on said bows, the rear section comprising bows adapted to be pivotally connected to the opposite sides of rear seat, a cover section arranged on said bows, said cover section being adapted to be engaged with the inner end of the front cover section when said sections are in raised position, a flexible flap secured to said front cover section and adapted to overlap the adjacent end of said rear cover section, slotted reinforcing plates arranged in said flap and in the inner end of said rear cover section, and fastening screws arranged in the inner end of the front section and adapted to be engaged with the inner end of the rear section and with said flap whereby said sections are secured together to form a water tight joint.

2. A top for two seated vehicles consisting of front and rear sections adapted to be independently lowered and independently removed, said sections comprising bows, front and rear cover sections arranged on said bows, a slotted reinforcing plate arranged in the inner edge of the rear section, said reinforcing plate of the rear section being adapted to be engaged with the inner end of the front cover section, a flap pivotally connected to said front cover section and adapted to be closed into engagement with the inner end of the rear cover section, a reinforcing plate in said flap, a series of nuts secured to the inner edge of said front section, and headed fastening screws having threaded engagement with said nuts and adapted to be engaged with the slotted reinforcing plates in the engaging end of said rear cover section and with said flap whereby said parts are secured together to form a water tight joint.

3. A top for two-seated vehicles consisting of front and rear sections having overlapping inner ends, fastening devices for said overlapping inner ends comprising screws inserted therethrough and fixed nuts secured to the front section and provided with slotted extensions, a flexible curtain secured to the front section, straps secured to said curtain, and straps hung in the slotted extensions of said nuts and adapted to be secured to the straps on the curtain.

In testimony whereof I have hereunto set my hand in presence of two subscribing witnesses.

JAMES V. MITCHELL.

Witnesses:
 GEORGE M. ISENHONER,
 CHARLES ISENHONER.